United States Patent [19]

Lamberti et al.

[11] Patent Number: 5,369,575
[45] Date of Patent: Nov. 29, 1994

[54] CONSTRAINED NATURAL LANGUAGE INTERFACE FOR A COMPUTER SYSTEM

[75] Inventors: Donna M. Lamberti, Medfield; John M. Prager, Sharon; Mark Nappari, Arlington, all of Mass.

[73] Assignee: International Business Machines Corporation, Armonk, N.Y.

[21] Appl. No.: 884,747

[22] Filed: May 15, 1992

[51] Int. Cl.⁵ .................. G06F 15/38; G06G 7/60
[52] U.S. Cl. .................. 364/419.08; 395/12; 395/600
[58] Field of Search ............. 364/419.08; 395/10, 395/12, 63, 600

[56] References Cited

U.S. PATENT DOCUMENTS

| | | | |
|---|---|---|---|
| 4,638,445 | 1/1987 | Mattaboni | 364/424.01 |
| 4,811,199 | 3/1989 | Kuechler et al. | 395/600 |
| 4,829,423 | 5/1989 | Tennant et al. | 364/419.08 |
| 4,839,853 | 6/1989 | Deerwester et al. | 395/600 |
| 4,914,590 | 4/1990 | Loatman et al. | 364/419.08 |
| 4,930,071 | 5/1990 | Tou et al. | 395/600 |
| 4,931,935 | 6/1990 | Ohira et al. | 364/419.08 |
| 4,942,526 | 7/1990 | Okajima et al. | 364/419.08 |
| 4,974,191 | 11/1990 | Amirghodsi et al. | 395/275 |
| 4,994,967 | 2/1991 | Asakawa | 364/419.08 |
| 5,239,617 | 8/1993 | Gardner et al. | 395/12 |
| 5,255,386 | 10/1993 | Prager | 395/600 |

OTHER PUBLICATIONS

Prager et al., "Reason: An Intelligent User Assistant for Interactive Environment", IBM Systems Journal, vol. 29, No. 1, 1990, pp. 141–163.
Ogden et al., "An Intelligent Front End For SQL: Correcting User Errors With Natural Language Menus", Human Factors Center, San Jose, Calif. Document No. HFC-55.
Ringle et al., "Shaping User Input: A Strategy For Natural Language Dialogue Design", Interacting with Computers, vol. 1 No. 3 (Dec. 1989).
Cohen, P. R. and Sullivan, J. W. (1989), "Synergistic Use of Direct Manipulation and Natural Language", ACM Computer Human Interaction 1989 Proceedings, Apr. 30–May 4, Austin, Tex. pp. 227–232.
Gomez, L. M. and Lochbaum, C. C. (1984), "People Can Retrieve More Objects With Enriched Key-Word Vocabularies. But Is There A Human Performance Cost?", Human-Computer Interaction, Interact '84, S. Shackel (ed.), Elsevier Science Publishers B.V. (North-Holland), pp. 257–261.
McCord, M., "Natural Language Processing In Prolog" Knowledge Systems and Prolog., A. Walker (ed.), Addision-Wesley Publishing Company Reading, Mass. (1987), pp. 326–325.
Napier, H. A. Lane, D. M., Bastell, R. R. and Guadango, N. S. (1989), "Impact Of A Restricted Natural Language Interface On Ease Of Learning And Productivity", Communications of the ACM, vol. 32, No. 10, pp. 1190–1197.
Warren D. H. D. and Pereira, F. C. N. (Jul.–Dec. 1982), "An Efficient, Easily Adaptable System For Interpreting Natural Language Queries", American Journal of Computational Linguistics, vol. 8, No. 3–4, pp. 110–123.

*Primary Examiner*—Gail O. Hayes
*Assistant Examiner*—Stephen R. Tkacs
*Attorney, Agent, or Firm*—Perman & Green

[57] ABSTRACT

A user/computer interface is described that employ a constrained natural language-form input. The computer employs a feedback method to reinforce a user's confidence and knowledge that the computer comprehends a query or instruction. The user interface initially parses a user's natural language-form input into a case frame. The case frame is then filtered into a goal-expression that comprises a verb and remaining syntactical portions of the input query/instruction. The system then paraphrases the goal-expression into constrained natural language-form and communicates the paraphrase to the user for confirmation that the computer system has correctly interpreted the user input. The computer also compares the goal-expression with prestored goal-expressions to determine a match and then performs an action in response to a match being found.

6 Claims, 3 Drawing Sheets

CONSTRAINED NATURAL LANGUAGE INTERFACE FOR A COMPUTER SYSTEM

FIELD OF THE INVENTION

This invention relates to a user/computer interface, and more particularly, to an interface that enables a user to input a natural language-form inquiry/command to the computer and to receive a confirmation that the computer comprehends the inquiry/command.

BACKGROUND OF THE INVENTION

Substantial efforts are continually being expended to improve and simplify the user/computer interface. Considerable effort has been expended in various attempts to enable a user to employ a natural language as the interface media. A natural language interface presents a number of problems. First, the complex characteristics of language cannot easily be mapped to structures that a computer can interpret and respond to. Consequently, natural language interaction systems have traditionally suffered from a lack of clarity insofar as understanding and response to instructions and queries are concerned. Also, the range of user perspectives and expectations for a natural language interface are so all-encompassing, that it is essentially impossible to design a "pure" natural language system that is universally understood. Given such limitations, a user is often required to expend substantial effort interacting, in a trial-and-error mode, with a computer to shed some light on how to construct a natural language query to find out about the computer's knowledge. Furthermore, traditional natural language systems have been designed with the thought that the user would query the computer and the computer would respond without any feedback to assist the user in understanding the computer's internal representation of the knowledge.

Many sophisticated computers employ a help function to enable the user to overcome difficulties experienced in the course of operating the computer. In the past, various "intelligent" help systems have been proposed, at least some of which incorporate concepts, techniques and tools from the field of artificial intelligence. See, for instance, U.S. Pat. No. 5,239,617, entitled "Method and Apparatus For Providing an Intelligent Help Explanation Paradigm Paralleling Computer User Activity" of Gardner et al., assigned to the same Assignee as this application. In the system described in that application, an intelligent help program is invoked by a user entering an erroneous command or a question. The help system then analyzes the command or question and, in response, allows the user to view one or more suggestions or explanations that are dynamically generated and tailored to the specific paths or goals of the user. Prager et al., in a paper entitled "Reason: An Intelligent User Assistant for Interactive Environment", IBM Systems Journal, Vol. 29, No. 1, 1990, pp. 141–163, describe details of an intelligent user/computer interface. The interface enables a user to query a computer system using a natural language input. "Reason" includes a parser which produces a "case frame" format syntactical analysis of the user's input query. The case frame is then used to generate a goal expression that is, in turn, used in a search for an answer to the user's query. The Reason system does not disclose the goal expression to the user, but rather uses it solely for internal search purposes.

Other natural language systems have been designed using a menu-based natural language discourse as the mode of interaction, see, Ogden et al., "An Intelligent Front End For SQL: Correcting User Errors With Natural Language Menus", Human Factors Center, San Jose, Calif., Document No. HFC-55. In the Ogden et al. system, a user is prompted by a menu to select various parts of a sentence so as to be able to construct a query based on the structure and limitations of the system's knowledge-base. This type of design helps to overcome the problem of a user being unaware of the breadth of system interface coverage. However, it imposes an artificial limit on the set of queries that can be constructed.

Traditional approaches to natural language dialogue have used ordinary human conversation as the model for human-computer interaction. In trying to capture all the subtleties of natural dialogue, systems have been built that are enormously complex and computationally expensive. As such, they remain largely impractical.

Certain researchers have explored ways of minimizing the computer's processing burden by requiring user inputs to be in a more constrained form of natural language. Results of such studies have found that such a form may be desirable, as well as more practicable for enhancing efficiency and satisfaction with the interfaced system, i.e., see Ringle et al. "Shaping User Input: A Strategy For Natural Language Dialogue Design", Interacting with Computers, Vol. 1, No. 3 (December, 1989).

While many previous investigators have employed natural language interfaces for system queries and instructions, none appear to have employed user-feedback to provide help to the user by means of dynamically generated suggestions or by reason of confirmation of the computer's understanding of the natural language input. Exemplary descriptions of natural language interfaces can be found in the following:

Cohen, P. R. and Sullivan, J. W. (1989). "Synergistic Use of Direct Manipulation and Natural Language", ACM Computer Human Interaction 1989 Proceedings, April 30–May 4, Austin, TX, pp. 227–232. Gomez, L. M. and Lochbaum, C. C. (1984). "People Can Retrieve More Objects With Enriched Key-Word Vocabularies. But Is There A Human Performance Cost?", Human-Computer Interaction, INTERACT '84, B. Shackel (ed.), Elsevier Science Publishers B.V. (North-Holland), pp. 257–261.

McCord, M., "Natural Language Processing in Prolog" Knowledge Systems and Prolog., A. Walker (ed.), Addision-Wesley Publishing Company Reading, Mass. (1987), pp. 316–324.

Napier, H. A. Lane, D. M., Bastell, R. R. and Guadango, N.S. (1989), "Impact Of a Restricted Natural Language Interface On Ease of Learning and Productivity", Communications of the ACM, Vol. 32, No. 10, pp. 1190–1197.

Warren D. H. D. and Pereira, F. C. N. (July–December 1982), "An Efficient, Easily Adaptable System for Interpreting Natural Language Queries", American Journal of Computational Linguistics, Vol. 8, No. 3–4, pp. 110–123.

The patent prior art also shows various uses of natural language interfaces for computer systems. U.S. Pat. No. 4,914,590 to Loatman et al. describes a system for understanding natural language inputs that uses a syntactic parser to produce case frames for subsequent analysis. The Loatman et al. system makes no provision for feedback to the originator of the natural language input to enable revision of the inputs or an understanding on the part of the user that the system properly comprehends the input.

U.S. Pat. No. 4,994,967 to Asakawa describes an approach to parsing a natural language input to determine undefined words. The parsing task is accomplished by examining the grammatical relationships between undefined words and words immediately before and after.

U.S. Pat. No. 4,942,526 to Okajima et al. is concerned with the elimination of semantically impossible parses of ambiguous natural-language inputs. This is accomplished by reference to co-occurrence tables which are lists generated by examining a large number of existing texts or by knowing which words typically "go together". On the basis of the results of the co-occurrence relation, the parse is accordingly modified.

U.S. Pat. No. 4,974,191 to Amirghodsi et al. describes a system interface that performs semantic processing of natural language inputs. The natural language input is mapped from its natural form to a second language which includes corresponding words, based upon cryptographic techniques, including frequency of use, distribution, etc. A message is generated in the second language utilizing a second language retrieved as a result of the cryptographic functions.

U.S. Pat. No. 4,839,853 to Deerwester et al. employs a constrained natural language as an alternative input medium. In trying to determine the semantic relationships between input words and documents in a data base, Deerwester et al. store document information and process the contents to form matrices of frequency of occurrence of words. Those matrices are employed in the syntactical analysis of a query.

U.S. Pat. No. 4,829,423 to Tennant et al describes the use of a menu-based front-end natural language input.

U.S. Pat. No. 4,931,935 to Ohira et al. describes a user interface wherein a natural language is employed to interact with an information retrieval system. The Ohira et al. system is directed at a procedure for minimizing response delays to a user input. The system attempts to predict (using a semantic network representation) follow-up questions and presents the system-generated guesses on a menu for user selection.

U.S. Pat. Nos. 4,811,199 to Kuechler et al. and 4,930,071 to Tou et al. both describe systems for enabling information-based or knowledge-based systems to communicate with other subsystems within a computer. Both systems describe the use of maps from the database to another portion of the system.

Accordingly, it is an object of this invention to provide a user/computer interface that employs a constrained, natural language.

It is another object of this invention to provide a user/computer interface wherein the computer provides feedback to the user that enables the user to understand the level of comprehension of the computer to a natural language input.

It is yet another object of this invention to provide a natural language-based user/computer interface wherein a single simplified query form is used, both to provide feedback to the user and to provide internal queries to a knowledge and/or database in the computer.

SUMMARY OF THE INVENTION

A user/computer interface is described that employs a constrained natural language-form input. The computer employs a feedback method to reinforce a user's confidence and knowledge that the computer comprehends a query or instruction. The user interface initially parses a user's natural language-form input into a case frame. The case frame is then filtered into a goal-expression that comprises a verb and remaining syntactical portions of the input query/instruction. The system then paraphrases the goal-expression into natural language-form and communicates the paraphrase to the user for confirmation that the computer system has correctly interpreted the user input. The computer also compares the goal-expression with prestored goal-expressions to determine a match and then performs an action in response to a match being found.

DETAILED DESCRIPTION OF THE INVENTION

A computer is configured to respond to natural language-form inquiries which are expressed in a constrained form of natural language. The user is channelled towards use of the constrained form of the natural language by providing feedback in the constrained natural language in response to input queries and instructions. An input from the user is converted to a "goal-expression" whose language structure matches that stored in the computer's knowledge base. By comparing a goal-expression derived from an input with goal-expressions contained in the computer's knowledge base, matches are derived that are utilized in the computer's response to the user. The goal-expression derived from the input is also "paraphrased" and fed back to the user for confirmation of the computer's comprehension of the input query/instruction.

Figure 1:
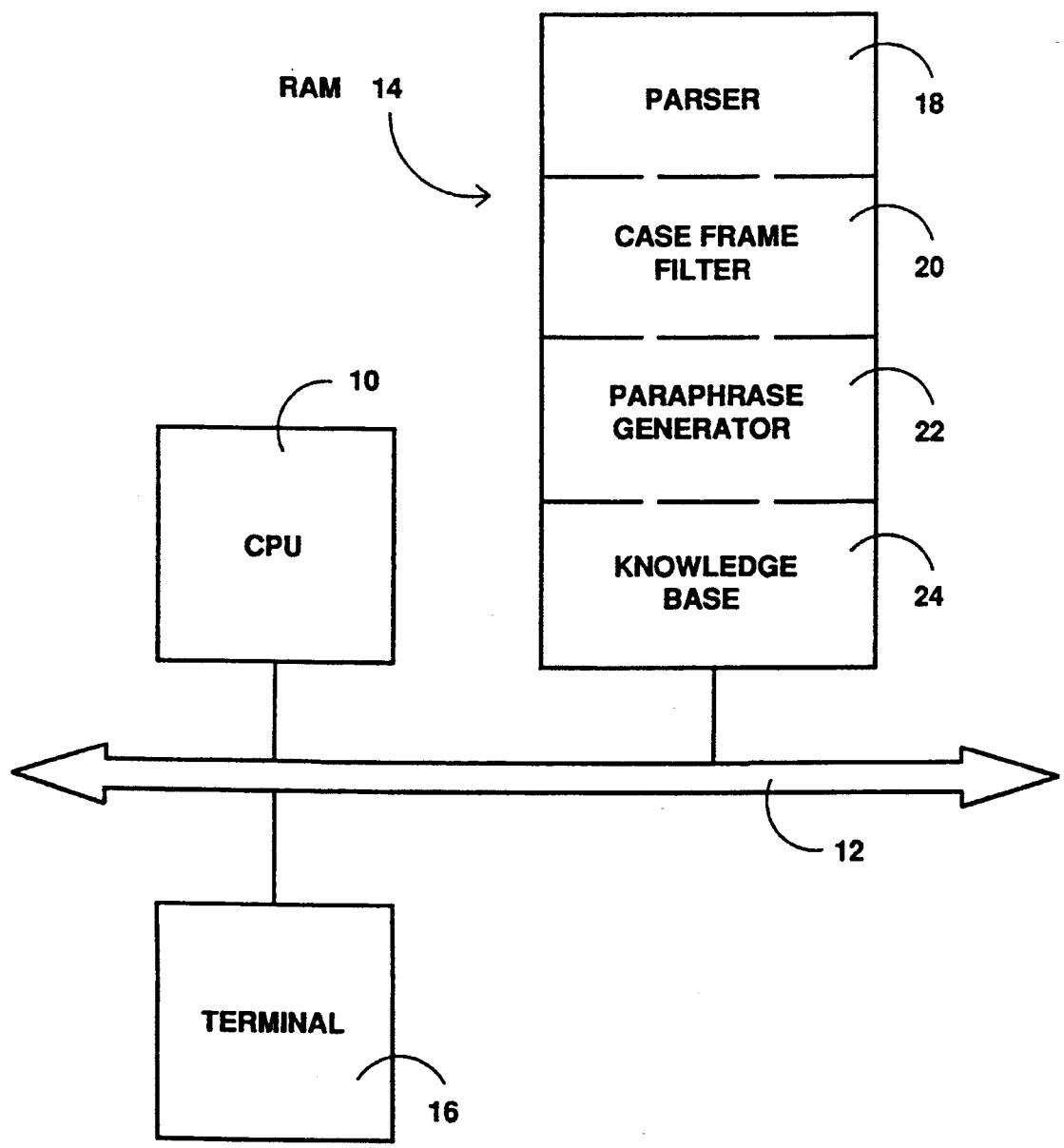
FIG. 1 is a high level block diagram of a computer adapted to perform the invention.

In FIG. 1 is shown a block diagram of a computer that is adapted to perform the method of the invention. A central processing unit 10 is connected via a bus (or busses) 12 to a random access memory 14 and to a user interface terminal 16. Memory 14 contains a parser 18 whose function it is to syntactically analyze a user query/command entered through terminal 16. Parser 18 produces a case frame which segregates the syntactical portions of the user input into pre-established relationships and identifies them with corresponding role identifiers. The case frame is fed to a case frame filter 20 which eliminates the role identifiers and utilizes the syntactical portions of the query/instruction to construct a goal-expression. That goal-expression is then fed to a paraphrase generator 22 which feeds back a paraphrase of the goal-expression to the user for confirmation purposes. Case frame filter 20 also feeds the goal-expression to a knowledge base 24 where CPU 10 determines if a match exists.

Figure 2:
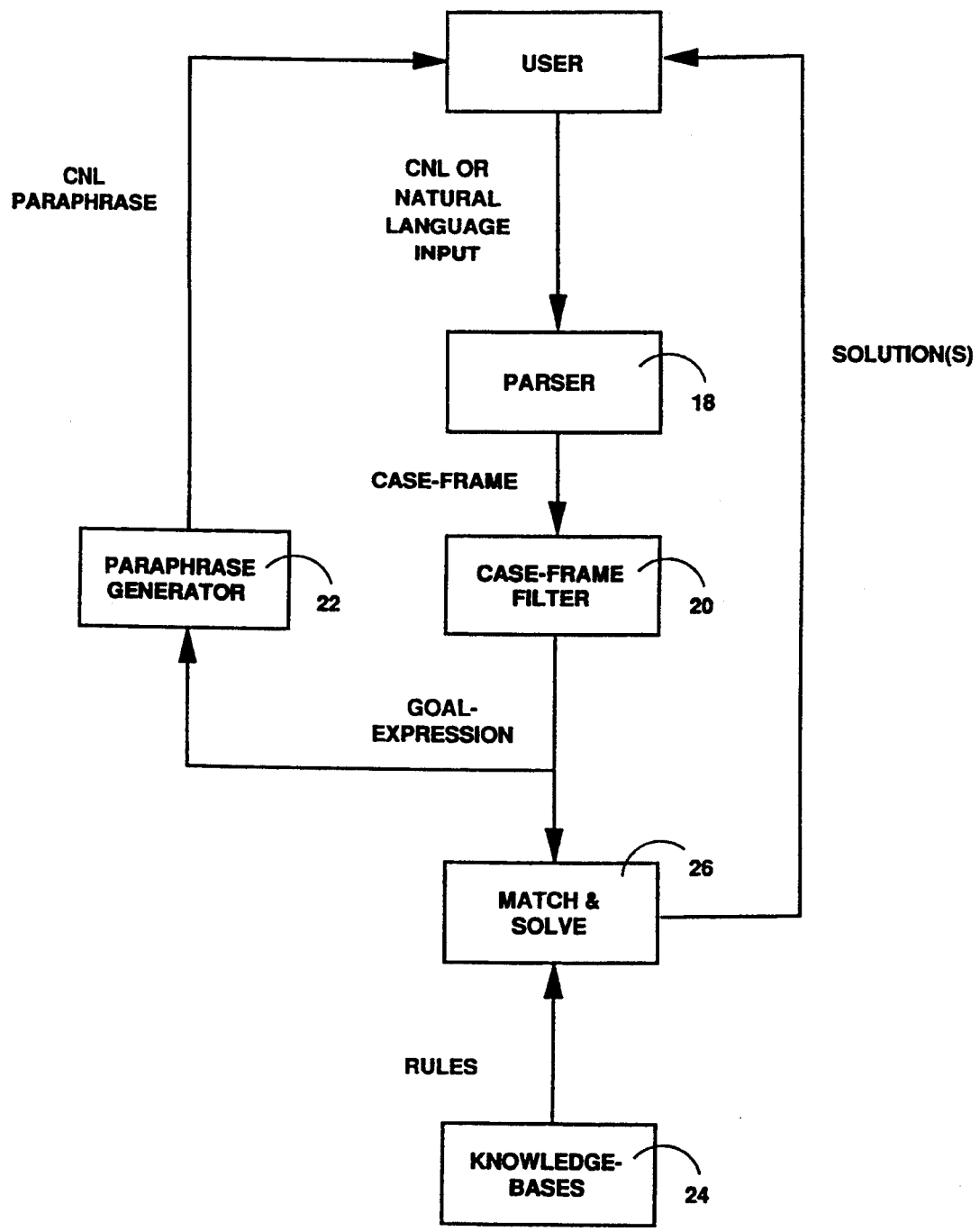
FIG. 2 is a flow diagram indicating the relationship of the major procedures and system components that combine to enable performance of the method of the invention.

The relationship of the procedures stored in RAM 14 is illustrated in FIG. 2. The detailed operation of the invention will be described with respect to FIG. 2 and in conjunction with a specific example illustrated in FIG. 3.

As above indicated, a user input is applied to a parser 18 which, in the known manner, segregates syntactical portions of the user's query/command into its syntax subcomponents. While, hereafter, a case frame will be described in relation to a output from parser 18, those skilled in the art will realize a parse tree could just as well be the output configuration.

Figure 3:
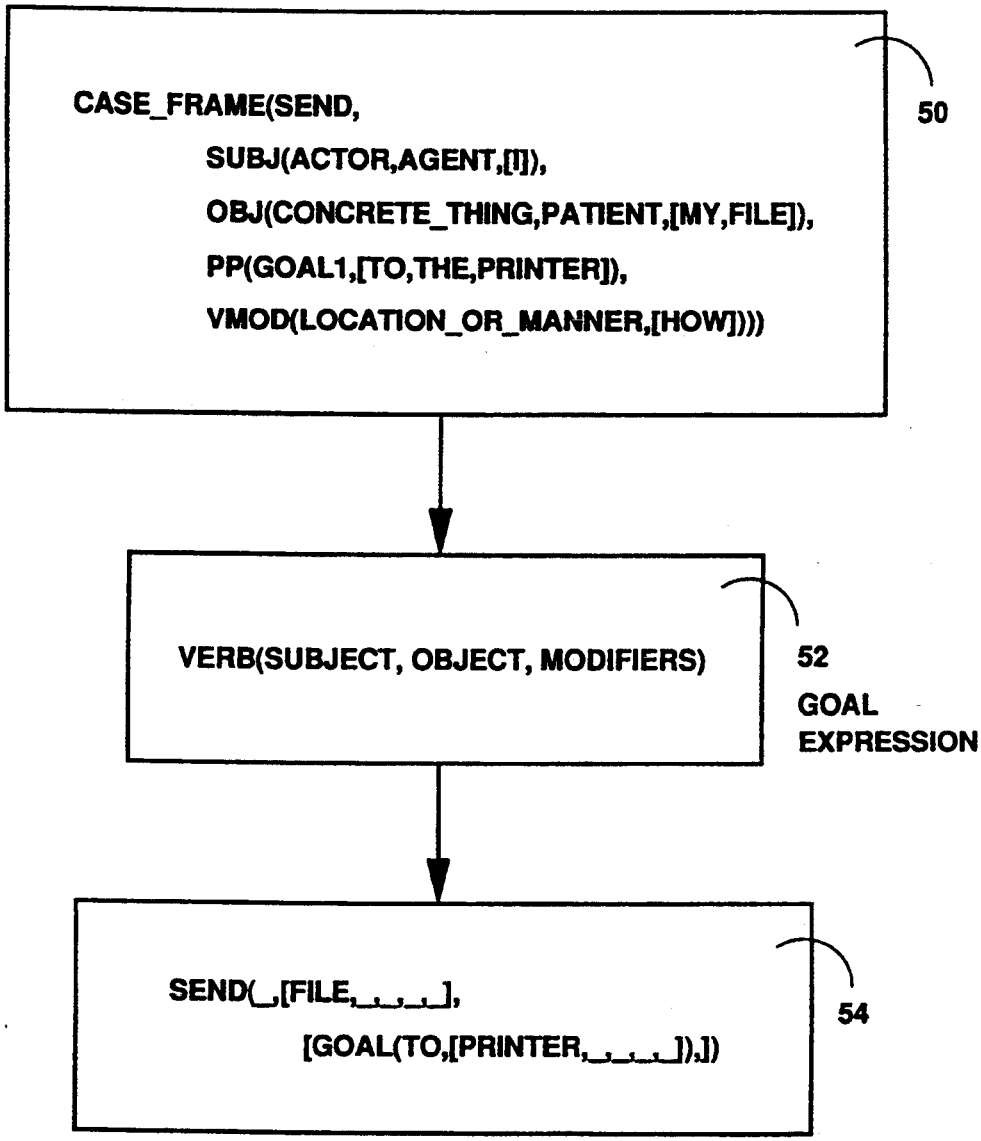
FIG. 3 is a schematic presentation of a case frame showing its conversion to a goal-expression.

In FIG. 3, a case frame 50 is illustrated that shows the various syntactical portions of a query sentence "How can I send my file to the printer?". The first line of case frame 50 comprises an identifier "case-frame", followed by one or more elements in parentheses, separated by commas. In this instance, the first element is the verb "send". The case frame analysis has further extracted the sentence's subject (subj), direct object (obj), prepositional phrase (pp) and verb-modifiers (vmod). Other possibilities that could be present in case frame 50, but are not illustrated, include indirect objects that are used with verbs such as "ask" and "tell".

Each of the four case elements (i.e., subj, obj, pp and vmod) are further analyzed by parser 18 and described. The subject and object are defined by "thing-type" and "role". The phrase between brackets is the actual subject, as determined by the parser. In the case frame shown at 50 in FIG. 3, the subject is the word [I] which is of a thing-type "actor" and is playing the role of "agent" for the verb "send". Other thing-types that are possible are: concrete-thing, software, etc. The list of thing-types is open-ended and may be configured by a user.

Some of the "role" possibilities are: (a) agent: the performer of an action; (b) patient: the object which is the focus or theme of an action; (c) goal-1: end point of a transfer, or destination; (d) goal-2: position where an object is made to appear; (e) recipient: actor that receives the object; and (f) source: a beginning point of transfer, a provider and origin. Not all of the aforesaid role descriptors are applicable to all verbs. For instance, intransitive verbs do not have "patients". The following roles or verb modifiers may be added to all verb types: location: time or place of action; manner: course of actions; instrument: object used in action; reason: justification for action; etc.

In case frame 50, the object of the sentence is "my file". It is both a concrete-thing and is the focus of the act defined by the verb, i.e., a "patient". The prepositional phrase "to the printer" defines goal 1 and the verb modifier role is as a location or manner for the modifier "how".

Once case frame 50 has been derived, parser 18 passes it to a case frame filter 20 wherein a goal-expression is derived. The goal-expression forms the basis of the constrained natural language that is both used in the storage format of knowledge bases 24, and as a feedback to the user for confirmation that the computer system probably understands the query/instruction. The feedback acts as a training vehicle whereby the user becomes more familiar with the constrained natural language and, after a period, will tend to use that input format in subsequent instructions and queries to the computer.

The goal-expression, as illustrated at 52 in FIG. 3, comprises the verb of the query/instruction, followed by the subject, object and any modifiers in the user's sentence. More specifically, the goal-expression consists of a predicate name, representing an action, and arguments representing the object's attributes involved in the action. Each object is represented by a multi-part list called an object-descriptor. Thus, the subject and object each have a five element list which further describes the respective object (the modifier has a three element list). The object descriptor list includes the following: class, name, adjective, number, containing object. Each of those categories is as follows:

"Class" is what category an object falls into. For example, file XYZ is of class "file".

"Name" is the name of a particular object. For example, file XYZ has a name "XYZ".

"Adjective" is a one word description of the object. For example, in "last file", "last" is an adjective.

"Number" is a one word descriptor of the quantity of the object. For example, an object descriptor for "all files XYZ" would have an "all" in this field.

"Containing object" is another object descriptor representing an object which contains the first. This contemplates a complex phrase wherein one phrase is contained within another. For example in "all of the files XYZ in directory ABC", "directory" would be the containing object.

Returning now to FIG. 3, broadly defined goal-expression 52 is converted by case frame filter 20 to a detailed goal-expression 54 for the exemplary query "How can I send my file to the printer?". Goal-expression 54 is syntactically a predicate with three arguments as above described. The first entry into the goal-expression becomes the predicate name from the case frame, i.e., "send" in the example. The next slot (after the open parenthesis) is for the subject and the immediately succeeding slot is for the object. If either the subject or object is absent, the corresponding slot has inserted therein a "don't care" indication. These characteristics may be underscores that function indentically to the "anonymous variable" in the programing language PROLOG. They will successfully match any content, or another underscore in the corresponding position when goal expressions are matched against goal expression data in the knowledge base.

Furthermore, if the subject word is a pronoun (I or you, for example) the subject slot is again filled with a "don't care" indication, as the specific individual referred to is irrelevant to the desired solution. Thus, the slot immediately after the verb, "send", has an underline inserted therein in lieu of the subject.

The object slot is filled with the term "file" and since the file is not further identified, the remaining portions of the object descriptor are left with "don't care" underline inserts. It will be noted that, as the various lines from case frame 50 are loaded into goal-expression 54, that both of the "thing type" and "role" descriptions are dropped when the phrase is transformed into an object-descriptor.

As above indicated, the object's descriptor five slots are written as follows:

The noun is filled into the first slot;

If there is a label in the phrase (e.g., a printer name), it is put into the second slot.

If there is an adjective in the phase, it is put into the third slot.

If the noun is plural, the fourth slot becomes "all" otherwise it is set to "1".

If there is a nested prepositional phrase, then a separate object descriptor is generated for it and put in the fifth slot. Thus, as shown at 54 in FIG. 3, prepositional phrase "to the printer" is converted as shown in the second line of the goal-expression. It is to be noted that the term "goal" remains in the goal-expression, but that it is used only for internal processing purposes and not for feedback to the user.

Once the goal-expression has been constructed, it is passed to paraphrase generator 22 (see FIG. 2). There, a constrained natural language form of the goal expression is generated by stripping off the parentheses, commas, underscores and remaining case identifiers such as the term "goal" and outputting the remaining terms in the order they appear. Internal components of an object-expression are output in order: quantity, adjective, class, label, container.

Assuming the user inputs the query "How can I send my file to the printer?", the constrained natural language form of that query is simply "send file to printer". This paraphrase is transmitted to the user and confirms that the computer has understood the query/instruction. In addition, it is an indicator of the kind of syntax employed by the computer and will, over time, enable the user to better understand and utilize the constrained natural language.

The goal/expression is also fed to a match and solve function 26 which accesses knowledge base 24 wherein an identical goal expression syntax for data is employed. Thus, a simple match search is run and, upon a match being found, feedback is presented to the user (if a query was the input). If, on the other hand, an instruction or command was the input, the instruction is accordingly executed, after the user confirms that the computer properly comprehends the instruction.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a computer implemented user interface for responding to a natural language-form input, said interface employing a feedback method to reinforce a user's confidence and knowledge that the computer comprehends a query or an instruction from the user, the method comprising:

parsing a user's natural language input into a case frame structure;

filtering said case frame structure into a goal-expression data structure comprising a verb and syntactical portions of said natural language input;

converting said goal-expression into a constrained natural language-form that includes said verb and syntactical portions of said goal-expression data structure and communicating said paraphrase to said user for confirmation that the computer system has correctly interpreted the user's input;

upon confirmation by said user, comparing said goal expression data structure with pre-stored data structures of goal expression form to determine a match; and performing an action in response to a match being found.

2. The method as recited in claim 1, wherein said goal-expression includes components that comprise:

a verb, subject, object and modifiers, all as derived from said natural language input by said filtering step.

3. The method as recited in claim 2, wherein said natural language input is in the form of a constrained natural language.

4. The method as recited in claim 3, wherein said converting step employs said goal-expression data structure to construct a constrained natural language response to the user, said converting step employing for said constrained natural language response, only phrases derived from said user input while discarding all other portions of the goal-expression data structure.

5. The method as recited in claim 2, wherein said goal expression includes characters that are interpreted as "don't care" symbols.

6. The method as recited in claim 5, wherein said comparing step ignores said "don't care" symbols and provides an output indicative of the closest match to the components of said goal-expression.

* * * * *